(12) United States Patent
Oe et al.

(10) Patent No.: US 9,991,788 B2
(45) Date of Patent: Jun. 5, 2018

(54) POWER FACTOR CORRECTION CIRCUIT FOR REGULATING OPERATING FREQUENCY CONTROL CIRCUIT OF POWER FACTOR CORRECTION CIRCUIT AND CONTROL METHOD THEREOF, ELECTRONIC APPARATUS, AND POWER ADAPTER

(71) Applicant: ROHM CO., LTD., Ukyo-Ku, Kyoto (JP)

(72) Inventors: Takumi Oe, Kyoto (JP); Hiroyuki Murakami, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days. days.

(21) Appl. No.: 15/388,251

(22) Filed: Dec. 22, 2016

(65) Prior Publication Data

US 2017/0187279 A1  Jun. 29, 2017

(30) Foreign Application Priority Data

Dec. 25, 2015  (JP) ................................. 2015-254128

(51) Int. Cl.
| | |
|---|---|
| *H02M 3/158* | (2006.01) |
| *H02M 1/42* | (2007.01) |
| *H02M 7/06* | (2006.01) |

(52) U.S. Cl.
CPC ........... *H02M 1/42* (2013.01); *H02M 1/4225* (2013.01); *H02M 3/1584* (2013.01); *H02M 7/06* (2013.01);

(Continued)

(58) Field of Classification Search
CPC .... H02M 1/42; H02M 1/4208; H02M 1/4216; H02M 1/4225; H02M 3/156;

(Continued)

(56) References Cited

U.S. PATENT DOCUMENTS

| | | | | |
|---|---|---|---|---|
| 2009/0257257 | A1* | 10/2009 | Adragna | ............. H02M 3/1584 |
| | | | | 363/65 |
| 2010/0097041 | A1* | 4/2010 | Ayukawa | ............ H02M 1/4225 |
| | | | | 323/272 |

(Continued)

FOREIGN PATENT DOCUMENTS

| | | |
|---|---|---|
| JP | 2010233439 A | 10/2010 |
| JP | 2013059228 A | 3/2013 |
| JP | 2015019558 A | 1/2015 |

*Primary Examiner* — Jeffrey Gblende
*Assistant Examiner* — David A. Singh
(74) *Attorney, Agent, or Firm* — Cantor Colburn LLP

(57) ABSTRACT

A control circuit of a power factor correction circuit including two channels, each of which includes a switching transistor, an inductor and a rectification element, includes: an error amplifier amplifying an error of a feedback signal according to output voltage of the power factor correction circuit and target value of the feedback signal and generating an error signal; a pulse modulator generating first and second pulse modulated signals in current critical mode in response to the error signal; a first driver driving the switching transistor of first channel based on the first pulse modulated signal; and a second driver driving the switching transistor of second channel based on the second pulse modulated signal, wherein the pulse modulator switches between a first mode where phase difference between the first and second pulse modulated signals is 180° and a second mode where the first and second channels are exclusively and alternately used.

17 Claims, 14 Drawing Sheets

(52) U.S. Cl.
CPC .... *H02M 2003/1586* (2013.01); *Y02B 70/126* (2013.01)

(58) Field of Classification Search
CPC .. H02M 3/158; H02M 3/1582; H02M 3/1584; H02M 2003/1586; H02M 7/06; H02M 7/12; H02M 7/155; H02M 7/1552; H02M 7/1555
See application file for complete search history.

(56) References Cited

U.S. PATENT DOCUMENTS

| | | | | |
|---|---|---|---|---|
| 2010/0109625 | A1* | 5/2010 | Ohtake | H02M 3/1584 |
| | | | | 323/282 |
| 2010/0244789 | A1* | 9/2010 | Osaka | H02M 3/1584 |
| | | | | 323/271 |
| 2011/0043177 | A1* | 2/2011 | Chen | H02M 1/4225 |
| | | | | 323/283 |
| 2014/0334196 | A1* | 11/2014 | Chen | H02M 3/1584 |
| | | | | 363/21.04 |
| 2016/0094142 | A1* | 3/2016 | Mahdavikhah | H02M 1/4225 |
| | | | | 363/44 |
| 2016/0322898 | A1* | 11/2016 | Bianco | H02M 1/4225 |
| 2016/0365799 | A1* | 12/2016 | Nakano | H02M 3/33546 |

* cited by examiner

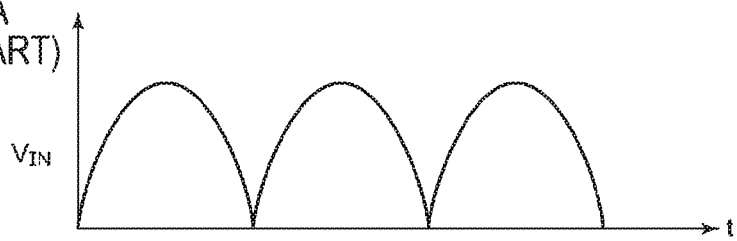
FIG. 2A
(PRIOR ART)
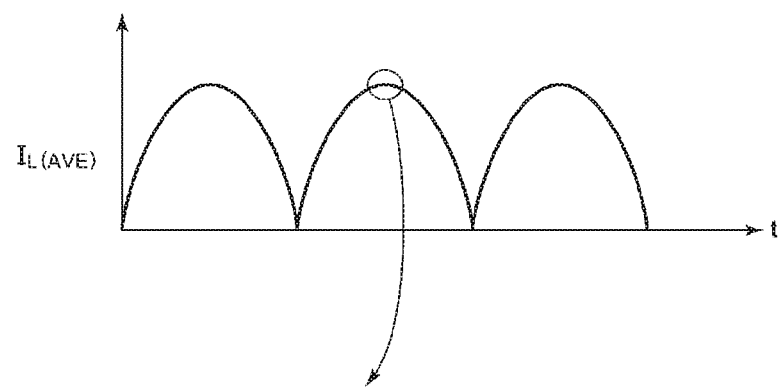
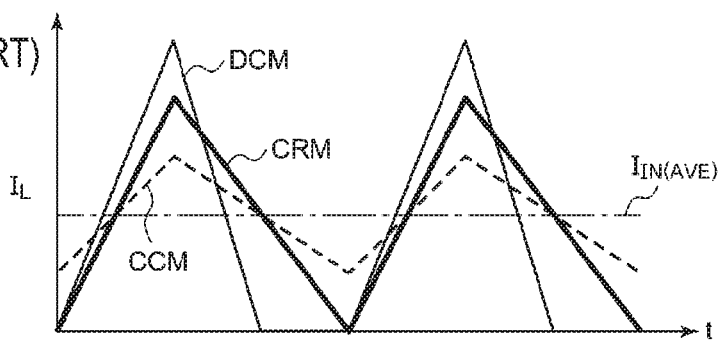
FIG. 2B
(PRIOR ART)

POWER FACTOR CORRECTION CIRCUIT FOR REGULATING OPERATING FREQUENCY CONTROL CIRCUIT OF POWER FACTOR CORRECTION CIRCUIT AND CONTROL METHOD THEREOF, ELECTRONIC APPARATUS, AND POWER ADAPTER

CROSS-REFERENCE TO RELATED APPLICATION

This application is based upon and claims the benefit of priority from Japanese Patent Application No. 2015-254128, filed on Dec. 25, 2015, the entire contents of which are incorporated herein by reference.

TECHNICAL FIELD

The present disclosure relates to a power factor correction circuit.

BACKGROUND

A variety of home appliances including a television, refrigerator, air conditioner, etc. operate with external AC power. In addition, electronic apparatuses, including laptop computers, mobile phone terminals, tablet terminals and the like, can operate with external AC power or its built-in battery is charged with the AC power. Such home appliances and electronic apparatuses (hereinafter collectively referred to as an electronic apparatus) incorporate a switching power supply for converting a commercial AC voltage to AC/DC. Alternatively, in some cases, a switching power supply may be incorporated in an external power adapter (AC adapter) of the electronic apparatus.

The switching power supply includes a rectification circuit (diode bridge circuit) for rectifying an AC voltage, and an insulated DC/DC converter for stepping down the rectified voltage and supplying the stepped voltage to a load. When AC/DC conversion is performed with such a switching power supply, a current pulse with very high amplitude is generated. Such a current pulse causes problems such as radioactive noise, network loss and increase of total harmonic components. In order to solve these problems, a PFC (Power Factor Correction) circuit is mounted in an electronic apparatus consuming more than a predetermined power. The PFC circuit monitors an AC input voltage and an input current and makes their phases coincide with each other to make the power close to 100%.

FIGS. 1A and 1B are block diagrams of a power supply system including a PFC circuit. Referring to FIG. 1A, a power supply system 1R includes a rectification circuit 2 and a PFC circuit 100R. The rectification circuit 2 performs full-wave rectification of an AC voltage $V_{AC}$. A main circuit 102 of the PFC circuit 100R has a so-called step-up DC/DC converter topology and includes an inductor L1, a switching transistor M1, a diode D1 and an output capacitor Co. The main circuit 102 steps up an input voltage $V_{IN}$ by the switching operation of the switching transistor M1, and generates an output voltage $V_{OUT}$ which is stabilized to a predetermined voltage level. In some cases, a converter using a step-down converter or a transformer is adopted as the circuit form of the main circuit 102.

A control circuit 200R monitors the input voltage $V_{IN}$ and an input current (inductor current) $I_L$ in addition to the output voltage $V_{OUT}$ to be controlled. Then, while the waveform and phase of the input current $I_L$ are controlled in a minor loop (current loop) so as to approach those of the input voltage $V_{IN}$, the output voltage $V_{OUT}$ can approach its target voltage $V_{OUT(REF)}$ in a major loop (voltage loop).

FIGS. 2A and 2B are operation waveform diagrams of the PFC circuit 100R. FIG. 2A shows an average current $I_{L(AVE)}$ of the input current $I_L$ and the input voltage $V_{IN}$. A control method of the PFC circuit 100R is largely classified into a current continuous mode (CCM), a current discontinuous mode (CDM) and a critical current mode (CRM). FIG. 2B shows an enlarged input current waveform of a part of FIG. 2A in the current continuous mode, the current discontinuous mode and the critical current mode.

Here, in many electronic apparatuses, their power consumption is dynamically changed in a range from zero to the rated power depending on their operation state. The PFC circuit 100R of FIG. 1A is suitable for applications with a rated output of about 150 W. However, when adopting the PFC circuit 100R of FIG. 1A for an apparatus with a rated output of about 400 W, it is difficult to obtain high efficiency in a load range of 0 to 400 W. For this reason, a multichannel/multi-phase DC/DC converter is introduced. FIG. 1B shows a 2-channel PFC circuit 100S. The PFC circuit 100S includes inductors L1 and L2 and switching transistors M1 and M2 corresponding to two channels CH1 and CH2. A control circuit 200S switches the two channels with a phase difference of 360°/2 (=180°). FIG. 3 is an operation waveform diagram of the PFC circuit 100S of FIG. 1B. Each channel is controlled in the current critical mode.

FIG. 4 is a graphical view showing the load current dependency of power factor and operating frequency of a PFC circuit in a current critical mode. In the current critical mode, the operating frequency f increases as the load decreases. In the current critical mode, the operating frequency f increases even when the input voltage $V_{IN}$ rises. The PFC circuit has a response delay depending on a circuit configuration, a circuit constant, etc. Therefore, when the operating frequency f becomes too high, the PFC circuit operates in an uncontrollable region due to the response delay, which may result in a poor power factor. In addition, an increase in the operating frequency f leads to an increase in switching loss of the switching transistor M1, which is one factor of efficiency reduction of the PFC circuit in a light load state.

In order to solve this problem, there has been proposed a technique for stopping a switching operation of one of two channels in a light load state. According to this technique, an operation frequency in the light load state becomes lower than when a two-channel operation is maintained, thereby solving the above-mentioned problem.

However, when the present inventors examined the above-described technique, they came to recognize the following problem. That is, according to the above-described technique, it is not possible to freely set a switching point between a one-phase operation mode (single-phase mode) and the two-phase operation mode. Specifically, in the above-described technique, it is difficult to set the switching point within a region higher than 50% of a maximum output power in a two-phase operation mode. Depending on applications, there are some cases where it is desired to switch a mode at any point higher than 50% of the maximum output power, in which cases it is difficult to adopt the above-described technique for such applications. This issue should not be regarded as the general perception of those skilled in the art.

SUMMARY

The present disclosure provides some embodiments of a PFC circuit and a control method thereof which are capable of preventing an operation frequency from increasing in a light load state.

According to one embodiment of the present disclosure, there is provided a control circuit of a power factor correction circuit. The power factor correction circuit is constituted by two channels, each of which includes a switching transistor, an inductor and a rectification element. The control circuit includes: an error amplifier configured to amplify an error of a feedback signal according to an output voltage of the power factor correction circuit and a target value of the feedback signal and generates an error signal; a pulse modulator configured to generate a first pulse modulated signal and a second pulse modulated signal in a current critical mode in response to the error signal; a first driver configured to drive the switching transistor of a first channel based on the first pulse modulated signal; and a second driver configured to drive the switching transistor of a second channel based on the second pulse modulated signal. The pulse modulator may switch between a first mode in which a phase difference between the first pulse modulated signal and the second pulse modulated signal is 180° and a second mode in which the first channel and the second channel are exclusively and alternately used every switching period.

According to this embodiment, an increase in operating frequency in a light load state can be suppressed and a switching point between the first mode and the second mode may be freely set. In addition, in the second mode, circuit elements of the first channel and the second channel are used in a time-division manner, so that heat generation may be distributed to a plurality of circuit elements, thereby avoiding heat concentration.

The power factor correction circuit may further include a sense resistor disposed on a path of an input current of the power factor correction circuit. The control circuit may further include: a mode controller configured to switch between the first mode and the second mode based on a result of comparison between a voltage drop of the sense resistor and a threshold voltage. With this configuration, it is possible to appropriately detect a load state to be reflected in mode control.

The pulse modulator may include: a first reset signal generator which generates a first reset signal defining an on-time of the switching transistor of the first channel based on the error signal; a second reset signal generator which generates a second reset signal defining an on-time of the switching transistor of the second channel based on the error signal; a first set signal generator which generates a first set signal defining an off-time of the switching transistor of the first channel; a second set signal generator which generates a second set signal defining an off-time of the switching transistor of the second channel; and a logic circuit which generates the first pulse modulated signal and the second pulse modulated signal based on the first set signal, the first reset signal, the second set signal and the second reset signal.

According to another embodiment of the present disclosure, there is provided a control circuit of a power factor correction circuit. The power factor correction circuit is constituted by M (M being an integer of two or more) channels, each of which includes a switching transistor, an inductor and a rectification element. The control circuit includes: an error amplifier configured to amplify an error of a feedback signal according to an output voltage of the power factor correction circuit and a target value of the feedback signal and generate an error signal; a pulse modulator configured to generate pulse modulated signals of the M channels in a current critical mode in response to the error signal; and M drivers which correspond respectively to the M channels and are configured to drive the respective corresponding switching transistors based on the respective corresponding pulse modulated signals. The pulse modulator may switch between a first mode in which the pulse modulated signals of the M channels sequentially transition to an on-level with a phase difference of 360°/M and a second mode in which a plurality of consecutive switching periods are set as a period group, and, in each switching period included in the period group, a pulse modulated signal of one channel transitions to an on-level and then an off-level and pulse modulated signals of the remaining (M−1) channels are kept at an off-level, and, during the period group, each pulse modulated signal transitions to the off-level at least once after transitioning to the on-level.

According to this embodiment, an increase in operating frequency in a light load state may be suppressed and a switching point between the first mode and the second mode may be freely set. In addition, in the second mode, circuit elements of the plurality of channels are used in a time-division manner, so that heat generation may be distributed to a plurality of circuit elements, thereby avoiding heat concentration.

The power factor correction circuit may further include a sense resistor disposed on a path of an input current of the power factor correction circuit. The control circuit may further include: a mode controller configured to switch between the first mode and the second mode based on a result of comparison between a voltage drop of the sense resistor and a threshold voltage. With this configuration, it is possible to appropriately detect a load state to be reflected in mode control.

M may be equal to 2 and the period group may include two switching periods.

The pulse modulator may include: M reset signal generators, each of which generates a reset signals defining an on-time of the switching transistor of a corresponding channel based on the error signal; M set signal generators, each of which generates a set signal defining an off-time of the switching transistor of a corresponding channel; and a logic circuit which generates the pulse modulated signals of the M channels based on the reset signals of the M channels and the set signals of the M channels.

The set signal generator of each of the M channels may include: a zero-cross detection comparator configured to generate a zero-cross detection signal asserted when a current flowing in the inductor of a corresponding channel is zero; and a delay circuit configured to delay the zero-cross detection signal to generate the set signal. The zero-cross detection comparator of each channel may generate the zero-cross detection signal based on a voltage at a node between the switching transistor and the inductor of the corresponding channel.

An amount of delay of the delay circuit may be set based on an external circuit part.

The mode controller may include: a resistor connection terminal to which an external first resistor is connected; a voltage source which supplies a reference voltage to the resistor connection terminal via a second resistor, and a comparator configured to compare a voltage drop of the sense resistor and the threshold voltage generated in the resistor connection terminal. With this configuration, a mode may be selected based on an output of the comparator.

The control circuit may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate.

According to another embodiment of the present disclosure, there is provided a power factor correction circuit including the above-described control circuit.

According to another embodiment of the present disclosure, there is provided an electronic apparatus including: a rectification circuit configured to rectify an AC voltage; and the above-described power factor correction circuit configured to receive an output voltage of the rectification circuit.

According to another embodiment of the present disclosure, there is provided a power adapter including: a rectification circuit configured to rectify an AC voltage; and the above-described power factor correction circuit configured to receive an output voltage of the rectification circuit.

Any combinations of the above-described elements or changes of the representations of the present disclosure between methods, apparatuses and systems are effective as embodiments of the present disclosure.

BRIEF DESCRIPTION OF THE DRAWINGS

FIGS. 2A and 2B are operation waveform diagrams of the PFC circuit.

DETAILED DESCRIPTION

Figure 1A:
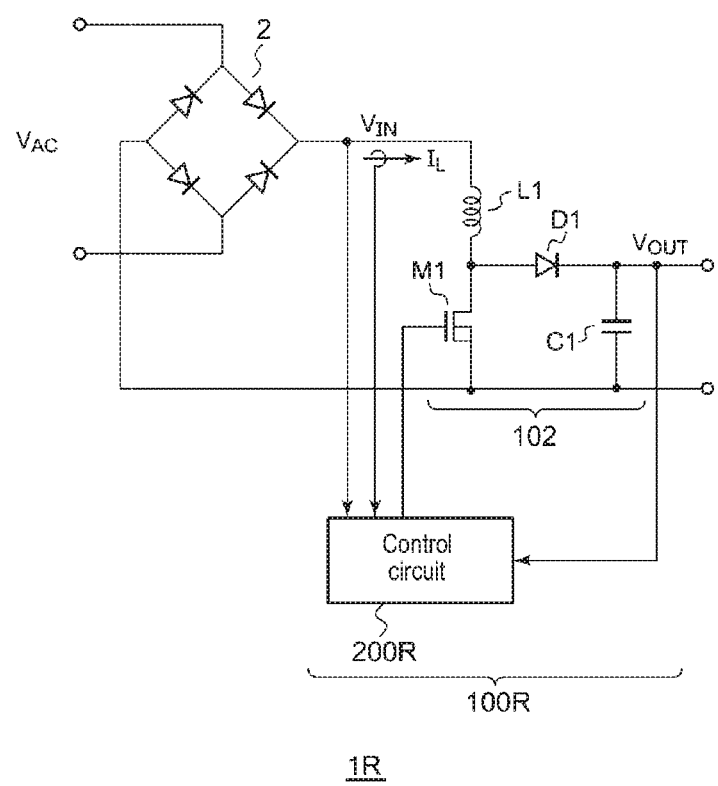
FIGS. 1A and 1B are block diagrams of a power supply system including a PFC circuit.
Figure 1B:
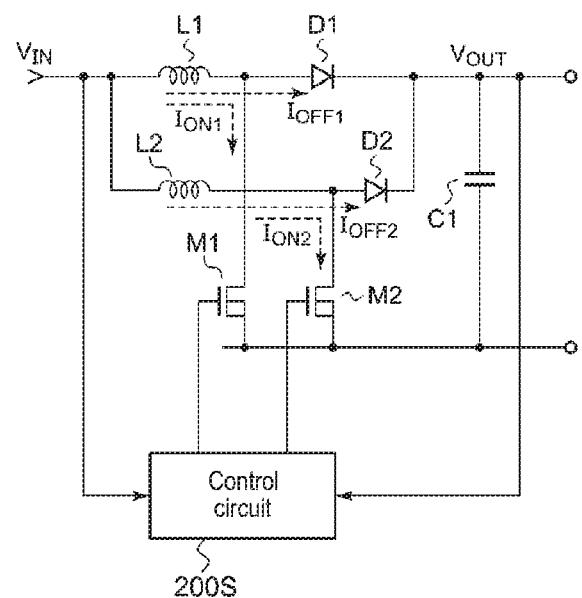
Figure 3:
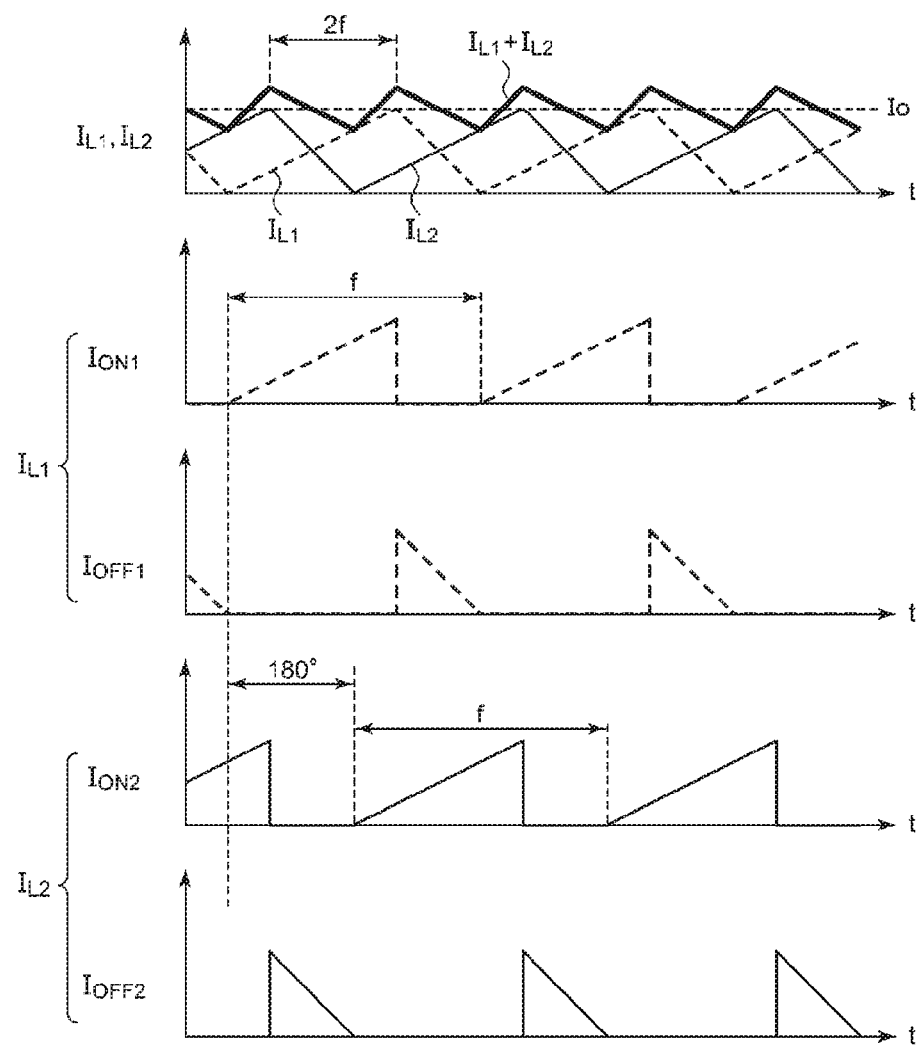
FIG. 3 is an operation waveform diagram of the PFC circuit of FIG. 1B.

Embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B. Similarly, the phrase "interposition of a member C between a member A and a member B" is intended to include direct connection of the member A and the member C or direct connection of the member B and the member C as well as indirect connection thereof via another member as long as the other member has no substantial effect on the electrical connection of the member A, the member B and the member C.

In addition, "signal A (voltage or current) is according to signal B (voltage or current)" means that the signal A has a correlation with the signal B. Specifically, it means that (i) the signal A is the signal B, (ii) the signal A is proportional to the signal B, (iii) the signal A is obtained by level-shifting the signal B, (iv) the signal A is obtained by amplifying the signal B, (v) the signal A is obtained by inverting the signal B, or (vi) any combination thereof, etc. It should be understood by those skilled in the art that a range of "according to" is determined depending on the types and uses of the signals A and B.

Figure 5:
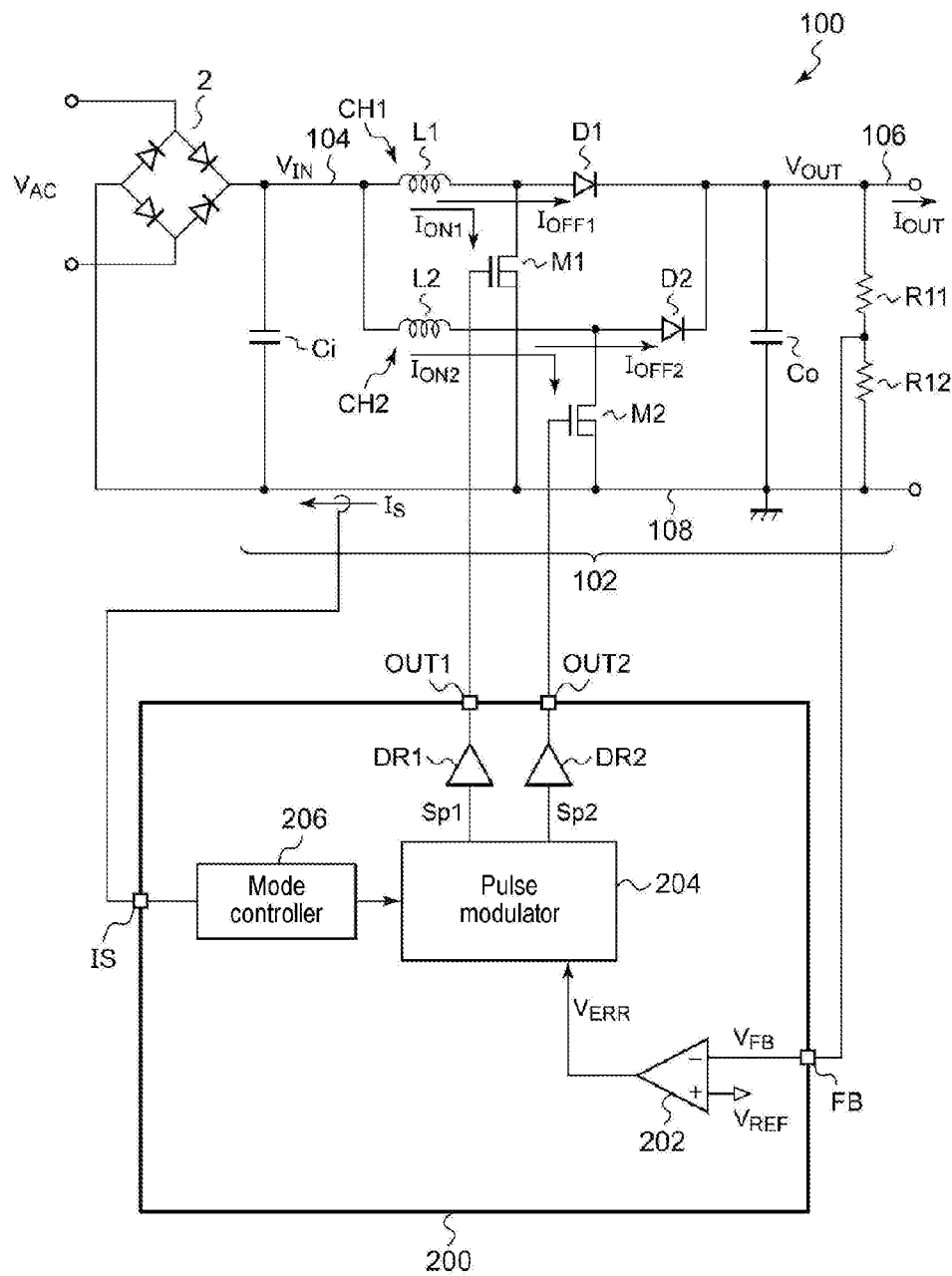
FIG. 5 is a circuit diagram of a PFC circuit including a control circuit according to an embodiment.

FIG. 5 is a circuit diagram of a PFC circuit 100 including a control circuit 200 according to an embodiment. The PFC circuit 100 includes a main circuit 102 and a control circuit 200. The main circuit 102 is a step-up DC/DC converter which receives a full-wave rectified input voltage $V_{IN}$ at it input line 104 from a rectification circuit 2 of a front stage, generates an output voltage $V_{OUT}$ stabilized to a predetermined level, and supplies the generated output voltage $V_{OUT}$ to a load (not shown) connected to an output line 106. The main circuit 102 is composed of M channels (M is an integer of 2 or more), each of which includes a switching transistor M, an inductor L and a rectifying element D. In the following description, for the purpose of easy understanding and concise explanation, the configuration of M=2 will be described. It is here assumed that a switching transistor, an inductor and a rectifying element of a first channel CH1 are M1, L1 and D1, respectively and a switching transistor, an inductor and a rectifying element of a second channel CH2 are M2, L2 and D2, respectively. An input capacitor Ci and an output capacitor Co are shared by a plurality of channels.

The control circuit 200 is a functional IC which includes an error amplifier 202, a pulse modulator 204, a mode controller 206 and M drivers DR1 to DRM (DR2 in FIG. 5) corresponding respectively to the M channels, all of which are integrated on a single semiconductor substrate. The output voltage $V_{OUT}$ of the main circuit 102 is divided by resistors R11 and R12 and a feedback signal $V_{FB}$ obtained by the voltage division is fed back to a feedback (FB) terminal of the control circuit 200.

The error amplifier 202 amplifies an error of the feedback signal $V_{FB}$ according to the output voltage $V_{OUT}$ and a predetermined reference voltage $V_{REF}$ and generates an error signal $V_{ERR}$. In response to the error signal $V_{ERR}$, the pulse modulator 204 generates pulse modulated signals Sp (a first pulse modulated signal Sp1 and a second pulse modulated signal Sp2 are shown in FIG. 5) of the M channels in a current critical mode. The configuration of the pulse modulator 204 is not particularly limited but may employ any technique known in the art. The pulse modulator 204 of the current critical mode may be (1) configured with a multiplier or (2) have a configuration in which a slope of an analog timer is changed according to an input voltage to generate an ON time.

The driver DR of each channel drives a switching transistor M of the corresponding channel based on a pulse modulated signal Sp of the corresponding channel. Specifically, the first driver DR1 drives the switching transistor M1 of the first channel CH1 based on the first pulse modulated signal Sp1 and the second driver DR2 drives the switching transistor M2 of the second channel CH2 based on the second pulse modulated signal Sp2.

The pulse modulator 204 can switch between at least two modes, namely, a first mode and a second mode. In the first mode, the pulse modulator 204 sets a phase difference between the first pulse modulated signal Sp1 and the second pulse modulated signal Sp2 to 180°. The operation in the first mode is as shown in FIGS. 2A and 2B. In the first mode, each channel operates in the current critical mode, but behaves like a continuous mode in terms of the total of all the channels.

In the second mode, the pulse modulator 204 uses the first channel CH1 and the second channel CH2 exclusively and alternately every switching period. Therefore, the phase difference between the first pulse modulated signal Sp1 and the second pulse modulated signal Sp2 is 360°.

The mode controller 206 switches the operation mode of the pulse modulator 204 according to the state of the load of the PFC circuit 100 (the amount of a load current $I_{OUT}$). The mode controller 206 monitors the total current $I_S$ of all the channels, determines the amount of the load current $I_{OUT}$ based on the total current $I_S$, and generates a mode control signal MODE indicating a mode. Alternatively, the mode controller 206 may receive a control signal indicating a load state from a load circuit (not shown) or other processor (not shown) and generate the mode control signal MODE based on the control signal. As another alternative, the control signal itself may be the mode control signal MODE.

Figure 6:
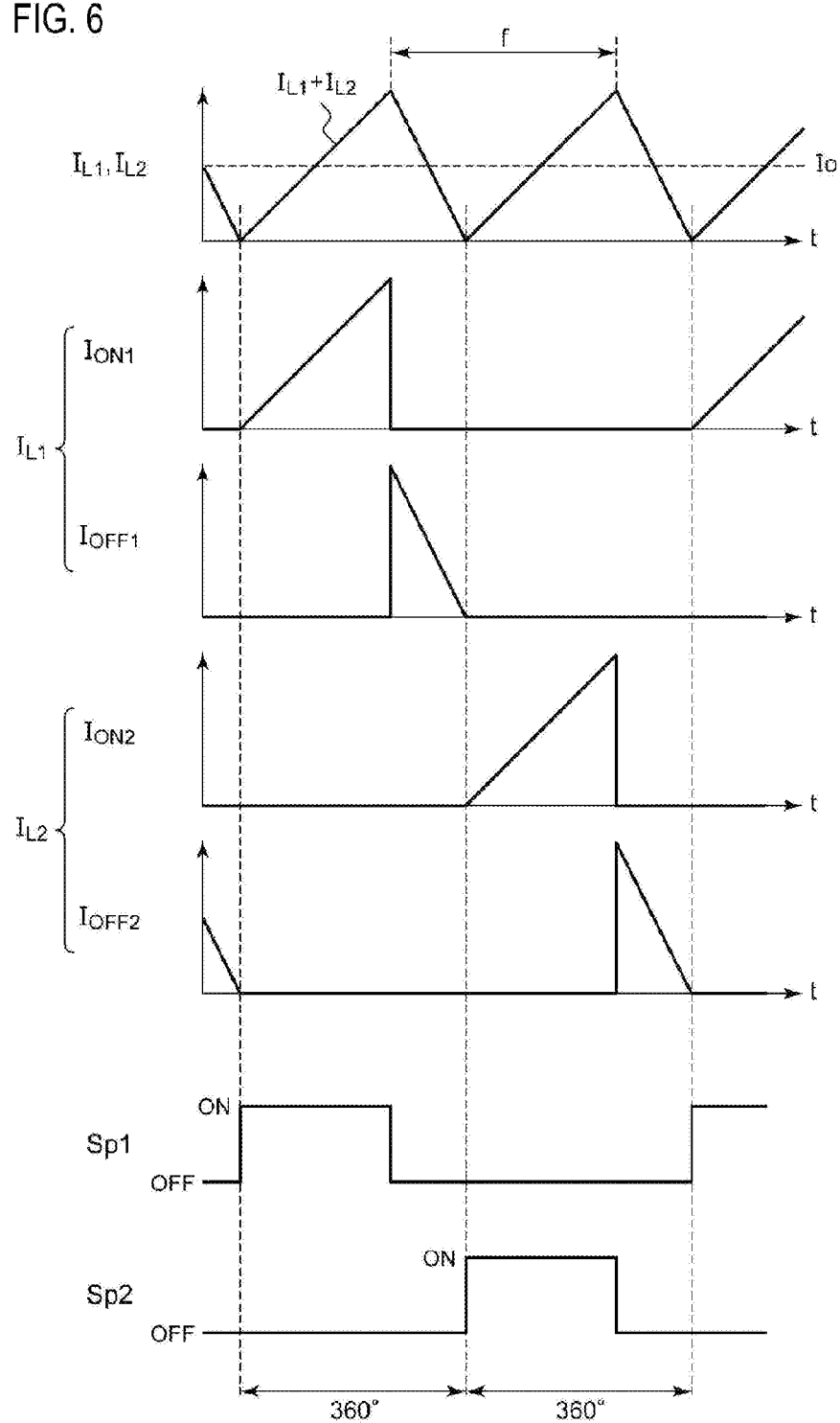
FIG. 6 is an operation waveform diagram of the PFC circuit of FIG. 5 in the second mode.

The above is the configuration of the PFC circuit 100 and its control circuit 200. Subsequently, the operation thereof will be explained. FIG. 6 is an operation waveform diagram of the PFC circuit 100 of FIG. 5 in the second mode. The first channel CH1 and the second channel CH2 are alternately activated every period, a switching transistor M of an active channel is switched, and a switching transistor M of an inactive channel is kept off. The first pulse modulated signal Sp1 and the second pulse modulated signal Sp2 alternately transition to an on level (high level) with a phase difference of 360°.

Figure 4:
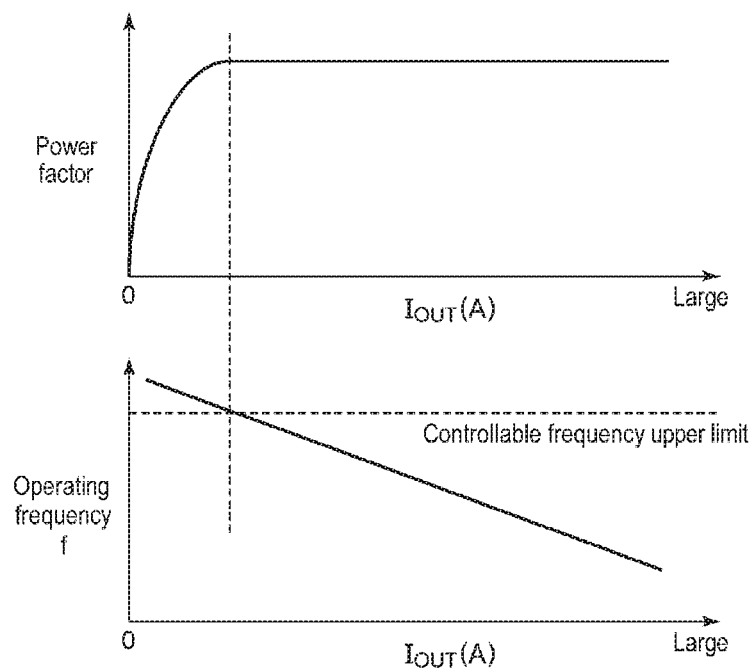
FIG. 4 is a graphical view showing the load current dependency of power factor and operating frequency of the PFC circuit in a current critical mode.
Figure 7:
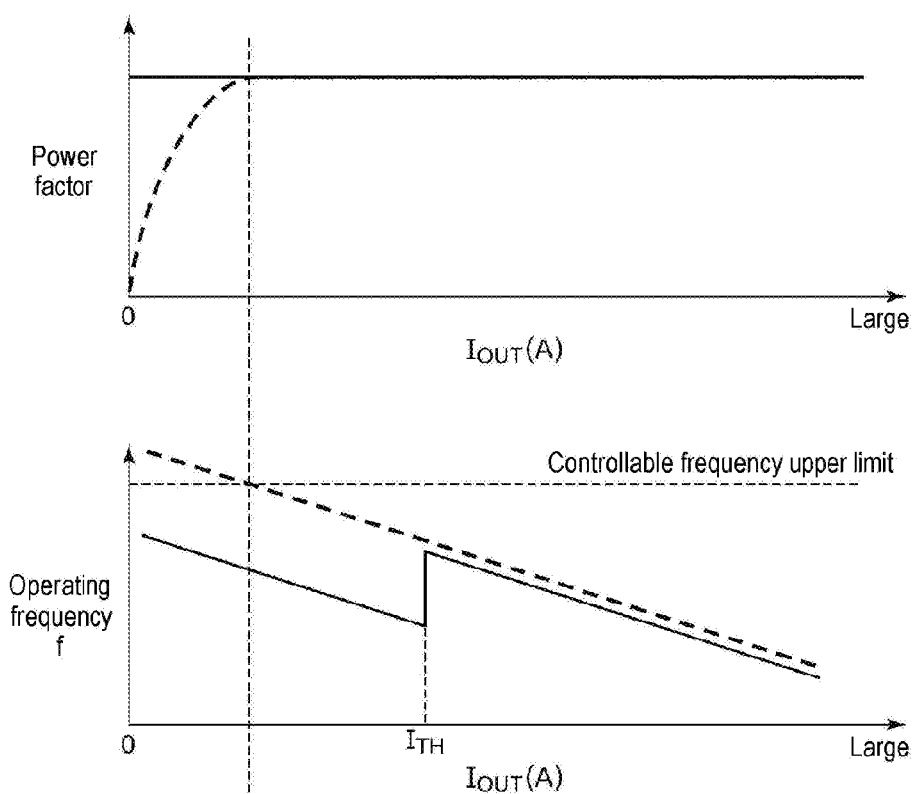
FIG. 7 is a graphical view showing the load current dependency of power factor and operating frequency of the PFC circuit of FIG. 5.

FIG. 7 is a graphical view showing the load current dependency of power factor and operating frequency of the PFC circuit 100 of FIG. 5. In FIG. 7, the characteristic of the conventional circuit of FIG. 4 is indicated by a dashed line. In the present embodiment, in a region where the load current $I_{OUT}$ is higher than a predetermined switching point (threshold value) $I_{TH}$, the PFC circuit 100 operates in the first mode. In this range, the operating frequency (switching frequency) f increases as the load current $I_{OUT}$ decreases. When the load current $I_{OUT}$ falls below the threshold value $I_{TH}$, the first mode is switched to the second mode. In the second mode, the operating frequency f decreases discontinuously at the switching point, and, as the load current $I_{OUT}$ further decreases, the operating frequency f increases.

The above is the operation of the PFC circuit 100. According to the PFC circuit 100, it is possible to keep the operating frequency f within a range which does not exceed a controllable upper frequency limit. As a result, it is possible to prevent the power factor from decreasing in a light load state. Further, it possible to prevent a switching loss from increasing and increase efficiency.

In addition, the PFC circuit 100 has an advantage that the switching point $I_{TH}$ can be freely set as compared with the conventional circuit. In other words, as described above, in the conventional circuit, it is difficult to set the switching point between the one-phase operation mode and the two-phase operation mode within a region higher than 50% of the maximum output power in the two-phase operation mode. This is because, when designing a power supply, considering distributing the power equally to each channel, power burdened by each phase is 50% of the maximum power and the maximum value of power obtained when only one phase is operated cannot exceed 50% of the total maximum power.

In contrast, in the present embodiment, it is possible to set the switching point within a region higher than 50% of the maximum power by interleaving a plurality of channels instead of completely stopping one channel in a light load state. This is because, when the plurality of channels are used alternately as in the present embodiment, the burden rate of each channel is kept equal.

Depending on applications, there are some cases where it is desired to switch a mode at any point higher than 50% of the maximum power, in which cases the PFC circuit 100 according to the embodiment provides versatility that may be adopted for such applications.

In addition, in the conventional circuit, a current always flows in one switching transistor, one inductor and one rectifying element in the one-phase operation mode. Therefore, heat generation concentrates on the set of the switching transistor, the inductor and the rectifying element of the use channel (effective channel). Meanwhile, according to the present embodiment, since a plurality of channels are used alternately, heat generation may be dispersed. This provides the further effect that the degree of freedom of the layout of circuit parts may be increased. When the layout of circuit components is restricted, the size and shape of a printed board on which the circuit components are mounted and the size and shape of a housing accommodating them are restricted. However, such restriction may be released when the PFC circuit 100 according to the embodiment is used.

The present disclosure is illustrated by the block diagram and the circuit diagram of FIG. 5 and extends to various devices and circuits which are derived from the above description, but is not limited to specific configurations and methods. The following description is given to a specific configuration example and a control method in order to help to understand the spirit of the present disclosure and circuit operation and clarify them, but not to narrow the scope of the present disclosure.

Figure 8:
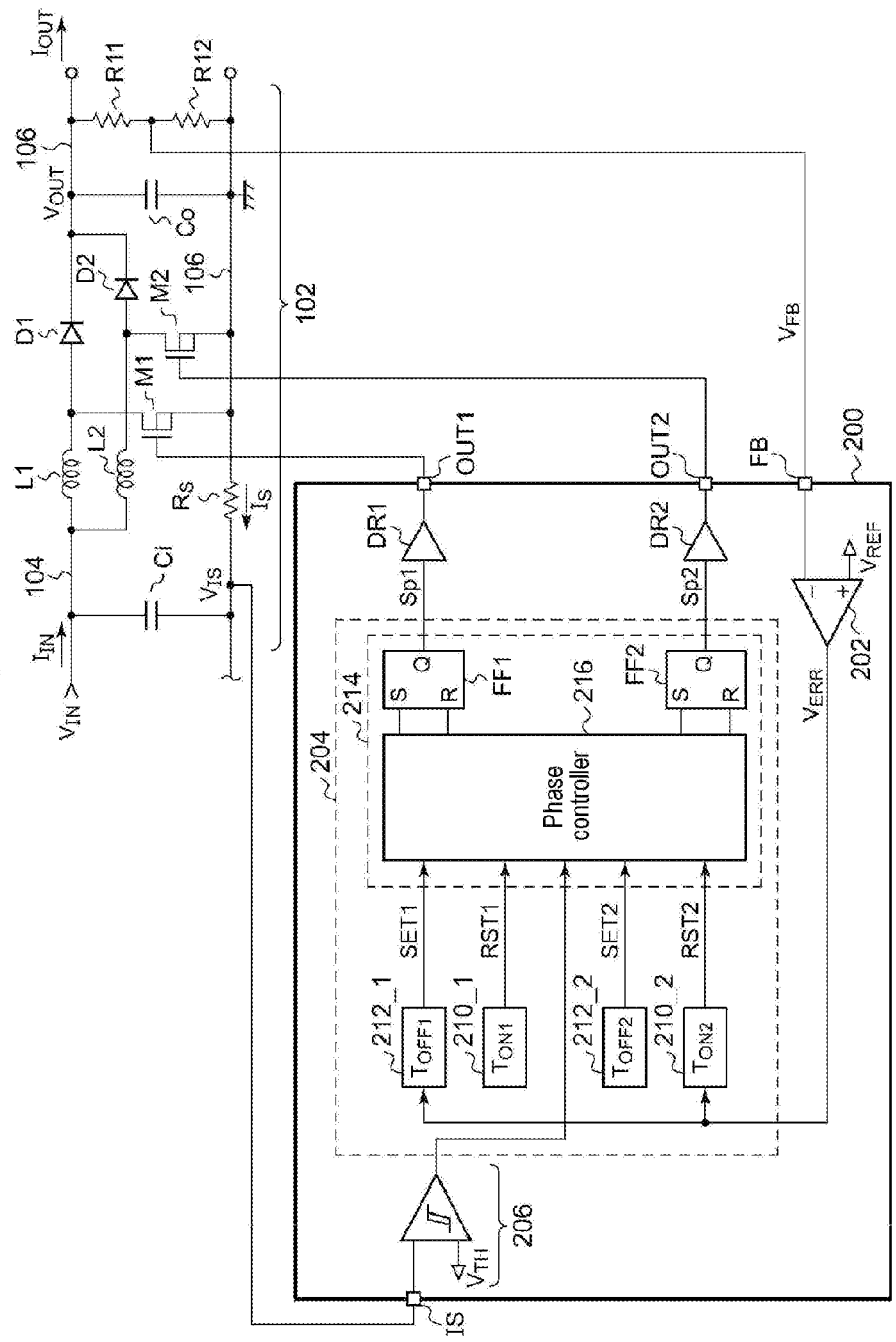
FIG. 8 is a block diagram illustrating a specific configuration example of the control circuit of FIG. 5.

FIG. 8 is a block diagram illustrating a specific configuration example of the control circuit 200 of FIG. 5. In the configuration of FIG. 8, the current $I_S$ corresponds to an input current $I_{IN}$ of the PFC circuit 100, which depends on the load current $I_{OUT}$. The main circuit 102 includes a sense resistor $R_S$ disposed on a path of the current $I_S$ to be detected. Specifically, the sense resistor $R_S$ is inserted in a path of the input current $I_{IN}$ to the PFC circuit 100, specifically, between an N pole output of the rectifier circuit 2 and a ground line. The control circuit 200 receives a current detection signal $V_{IS}$, which corresponds to a voltage drop of the sense resistor $R_S$, at its current detection (IS) terminal. The mode controller 206 switches between the first mode and the second mode based on a result of comparison between the voltage drop $V_{IS}$ of the sense resistor $R_S$ and a threshold voltage $V_{TH}$. For example, the mode controller 206 may include a voltage comparator which may be a hysteresis comparator.

The pulse modulator 204 includes M reset signal generators 210 corresponding to the M channels, M set signal generators 212 corresponding to the M channels, and a logic circuit 214. Based on an error signal $V_{ERR}$, a reset signal generator 210_i of an $i^{th}$ channel CHi (1≤i≤M) generates a reset signal RSTi defining an on-time $T_{ONi}$ of a switching transistor Mi of the corresponding channel CHi. In addition, a set signal generator 212_i of the $i^{th}$ channel CHi generates a set signal SETi defining an off-time $T_{OFFi}$ of the switching transistor Mi of the corresponding channel CHi.

The logic circuit 214 generates M-channel pulse modulated signals Sp1 to SpM. A pulse modulated signal Spi of each channel CHi responds to the corresponding reset signal RSTi and the corresponding set signal SETi. For example, the logic circuit 214 may include flip-flops FF1 to FFM provided respectively for the channels, and a phase controller 216. Although SR flip-flop are shown in FIG. 5, the flip-flops FF1 to FFM may be D flip-flops, SR latches, D latches or the like.

The phase controller 216 arbitrates the operation of the plurality of channels according to the current mode. At least one of the set signal SET, the reset signal RST, the pulse modulated signal Sp (or their inverted signals) is input from each channel to the phase controller 216. The phase controller 216 may pass the signal from one channel to another channel and control a phase difference of each channel based on the signal.

Figure 9:
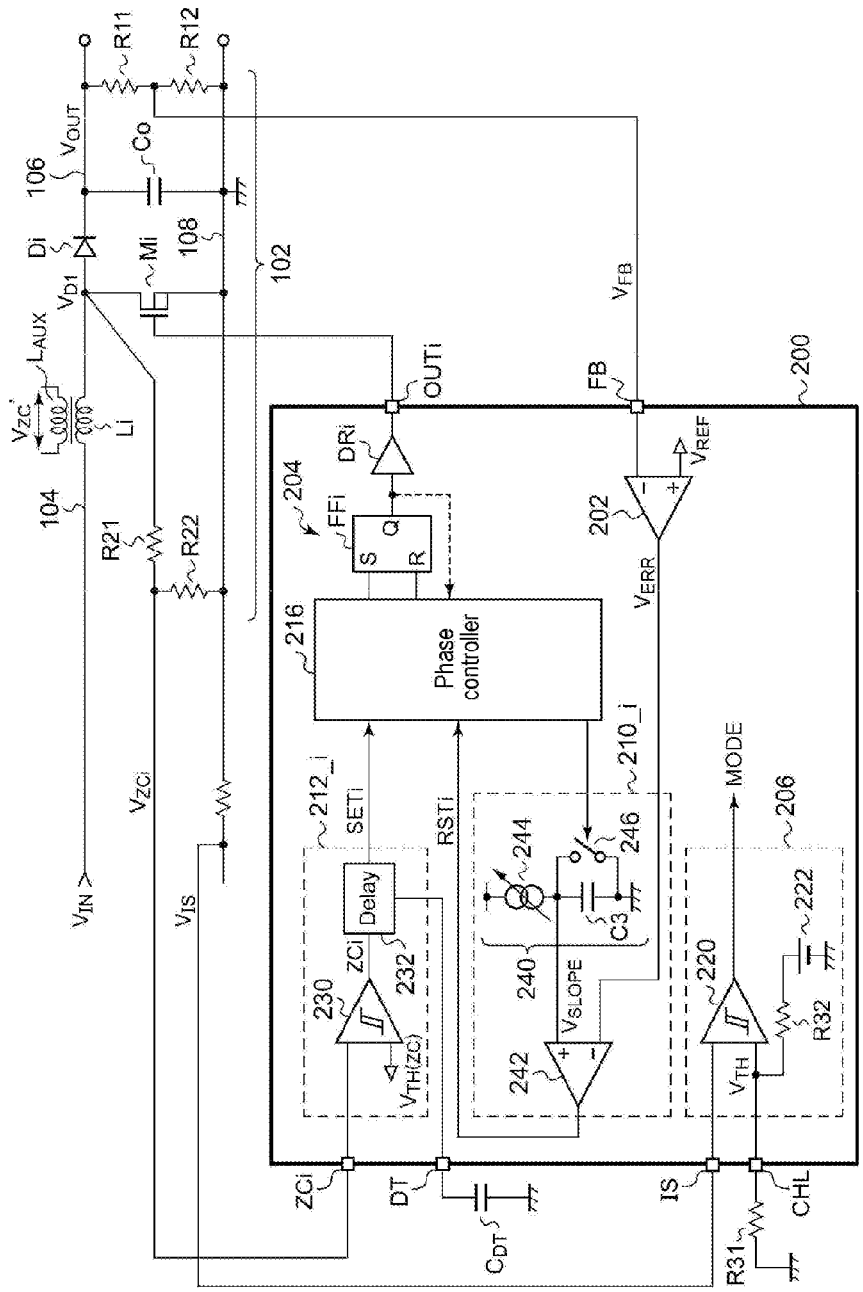
FIG. 9 is a block diagram illustrating a more specific configuration example of the control circuit of FIG. 8.

FIG. 9 is a block diagram illustrating a more specific configuration example of the control circuit 200 of FIG. 8. The control circuit 200 includes a resistance connection (CHL) terminal for setting a switching point of a mode. An external first resistor R31 may be connected between the CHL terminal and ground. The mode controller 206 includes a voltage source 222 and a second resistor R32 in addition to the voltage comparator 220. The voltage source 222 supplies a predetermined reference voltage to the CHL terminal via the second resistor R32. The voltage comparator 220 compares the voltage drop $V_{IS}$ of the sense resistor $R_S$ input to the IS terminal with the threshold voltage $V_{TH}$ generated at the CHL terminal.

Subsequently, the pulse modulator 204 will be described. Since all the channels have the same configuration, only the $i^{th}$ channel is shown for the pulse modulator 204. The control circuit 200 includes a zero-crossing detection (ZCi) terminal in order to detect that a coil current $I_{Li}$ of the corresponding inductor Li is zero. For example, a signal $V_{ZCi}$ corresponding to a voltage (drain voltage) $V_{Di}$ at a node between the switching transistor Mi and the inductor Li is input to the ZCi terminal. For example, the drain voltage $V_{Di}$ may be divided by resistors R21 and R22 to generate the signal $V_{ZCi}$. A zero-cross detection comparator 230 compares the voltage $V_{ZCi}$ with a predetermined threshold voltage $V_{TH(ZC)}$ and asserts a zero-cross detection signal ZCi when these voltages cross each other. A delay circuit 232 delays the zero-cross detection signal ZCi to generate a set signal SETi. The amount of this delay may be externally set. For example, the delay amount of the delay circuit 232 may be adjusted based on the capacitance of an external capacitor $C_{DT}$ connected to a delay time setting (DT) terminal. In addition, since the delay amount is common to all the channels, the DT terminal and the capacitor $C_{DT}$ may be shared by the delay circuits 232 of all the channels.

In addition, the set signal generator 212 may refer to another voltage instead of the drain voltage $V_{Di}$ of the switching transistor Mi. For example, an auxiliary winding $L_{AUX}$ may be provided in the inductor Li and a zero crossing point may be detected based on a voltage $V_{ZC}'$ generated in the auxiliary winding $L_{AUX}$. Alternatively, the set signal generator 212 may be constituted by a timer circuit. In other words, in the critical mode, the following relational expression is established between the off-time and the on-time.

$$T_{OFF} > V_{IN}/(V_{OUT} - V_{IN}) \times T_{ON}$$

Therefore, the set signal generator 212 may include an analog or digital timer circuit for measuring the off-time $T_{OFF}$ corresponding to the above relational expression. Alternatively, the set signal generator 212 may include a combination of a timer circuit and a zero-cross detection means.

The reset signal generator 210 includes a slope voltage generation circuit 240 which generates a slope voltage $V_{SLOPE}$, and a comparator 242. A slope of the slope voltage $V_{SLOPE}$ is adjusted based on the input voltage $V_{IN}$. For example, the slope voltage generation circuit 240 includes a capacitor C3, a current source 244 and a discharging switch 246. A charging current generated by the current source 244 is defined as a function of the input voltage $V_{IN}$. The discharging switch 246 is switched on in a period during which the switching transistor Mi is turned off, and is switched off in a period during which the switching transistor Mi is turned on. The comparator 242 compares the slope voltage $V_{SLOPE}$ with the error signal $V_{ERR}$ and asserts the reset signal RSTi (for example, high level) when the slope voltage $V_{SLOPE}$ rises to the error signal $V_{ERR}$.

Figure 10:
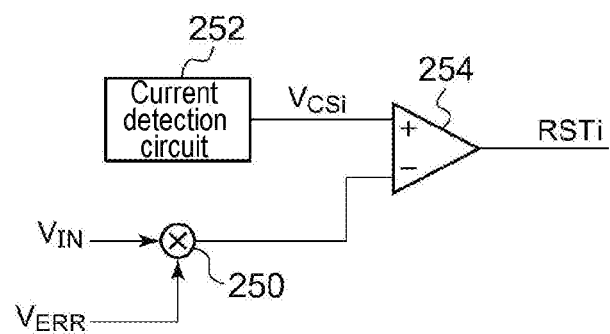
FIG. 10 is a circuit diagram illustrating another configuration of a reset signal generator.

It is noted that the configuration of the reset signal generator 210 is not limited to that shown in FIG. 9. FIG. 10 is a circuit diagram illustrating another configuration of the reset signal generator 210. A reset signal generator 210_i includes a multiplier 250, a current detection circuit 252 and a comparator 254. The multiplier 250 multiplies a detected value of the input voltage $V_{IN}$ by the error signal $V_{ERR}$. The current detection circuit 252 generates a current detection signal $V_{CSi}$ corresponding to the coil current $I_{Li}$ of the corresponding channel. It should be noted that the current detection signal $V_{CSi}$ is a signal for each channel, whereas the above-mentioned current detection signal $V_{IS}$ corresponds to the total sum of all the channels. The comparator 254 compares the current detection signal $V_{CSi}$ with an output of the multiplier 250 to generate a reset signal RSTi.

At least one of the set signal SETi, the reset signal RSTi, and the pulse modulated signal Spi is input to the phase controller 216 for all the channels. Based on the input signal, the phase controller 216 generates a set signal and a reset signal for a flip-flop FFi of each channel, and a control signal for the discharging switch 246.

For example, in the first mode, the phase controller 216 supplies the set signal SETi and the reset signal RSTi of the same channel CHi to the set terminal and the reset terminal of the flip-flop FFi, respectively. In addition, a logical inverted signal of an output Spi of the flip-flop FFi of the same channel may be supplied to the discharging switch 246 of the channel CHi.

In the second mode, the phase controller 216 may supply a reset signal RST(i+1) of another channel CH(i+1) to the set terminal of the flip-flop FFi of the channel CHi. Further, the phase controller 216 may supply the reset signal RSTi of the same channel CHi to the reset terminal of the flip-flop FFi and supply the logic inverted signal of the output Spi of the flip-flop FFi of the same channel to the discharging switch 246 of the same channel CHi. It is understood by those skilled in the art that the phase controller 216 may be constituted by a combinational circuit, a sequential circuit, a combinational/sequential circuit or the like.

The above is the specific configuration of the control circuit 200.

Figure 11:
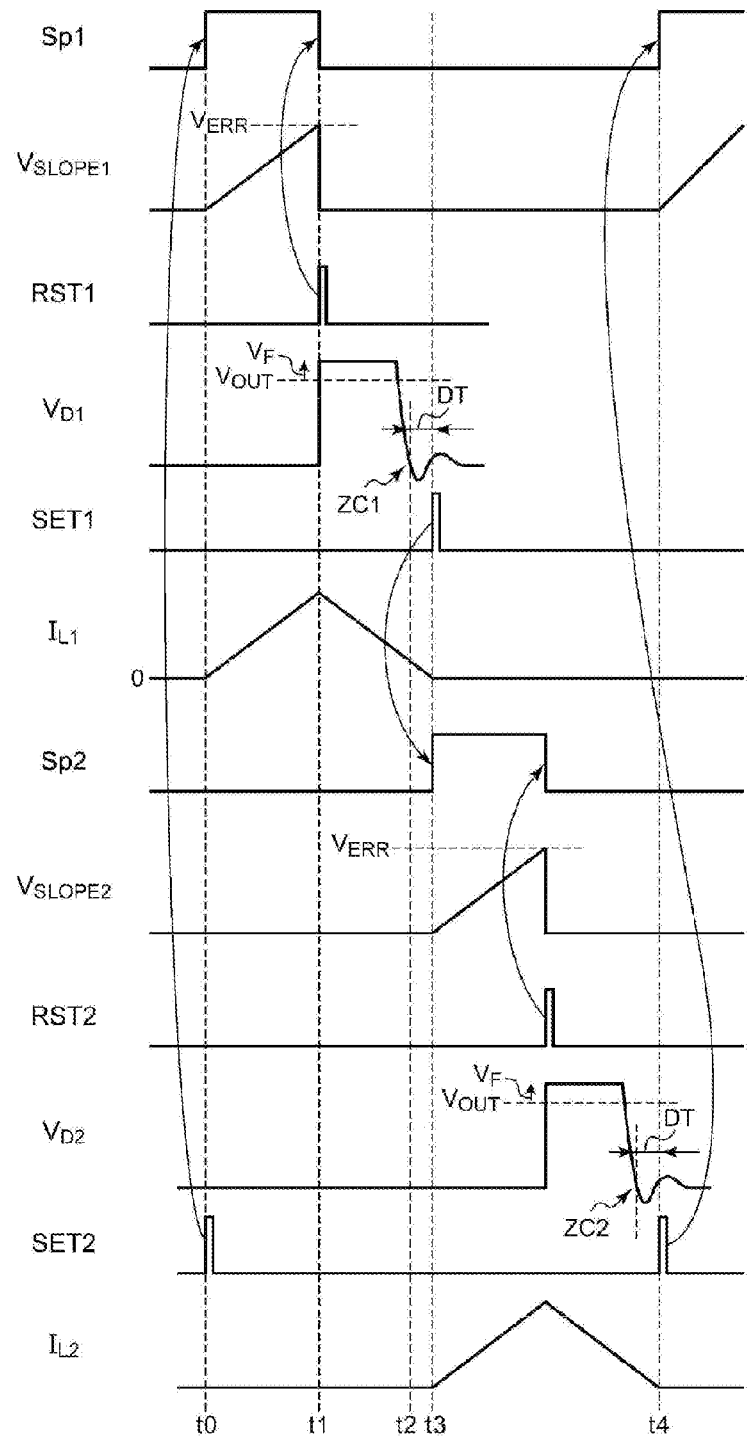
FIG. 11 is an operation waveform diagram of the control circuit of FIG. 9 in the second mode.

FIG. 11 is an operation waveform diagram of the control circuit 200 of FIG. 9 in the second mode. At time t0, in response to a set signal SET2 of the second channel CH2, the flip-flop FF1 is set, the pulse modulated signal Sp1 has a high level, and the switching transistor M1 is turned on. When the pulse modulated signal Sp1 has the high level, the discharging switch 246 of the reset signal generator 210i is switched off and a slope voltage $V_{SLOPE1}$ starts to rise. When the slope voltage $V_{SLOPE1}$ reaches the error signal $V_{ERR}$ at time t1, a reset signal RST1 is asserted, the pulse modulated signal Sp1 has a low level, and the switching transistor M1 is turned off.

When the switching transistor M1 is turned off, a current $I_{L1}$ of the inductor L1 flows through a diode D1, at which time a drain voltage $V_{D1}$ of the switching transistor M1 becomes $V_{OUT}+V_F$. $V_F$ is a forward voltage of the diode D1. Eventually, when the current IL1 becomes zero, the drain voltage $V_{DI}$ is changed and a zero cross is detected at time t2. A set signal SET1 is asserted at time t3 after the elapse of delay time DT set in the delay circuit 232 from the zero-crossing point. A flip-flop FF2 of the second channel CH2 is set by the set signal SET1, the pulse modulated signal Sp2 has a high level, and the switching transistor M2 is turned on. For the second channel CH2, the same processing as the first channel CH1 is repeated. When a set signal SET2 is asserted at time t4, the flip-flop FF1 of the first channel CH1 is set.

Figure 12:
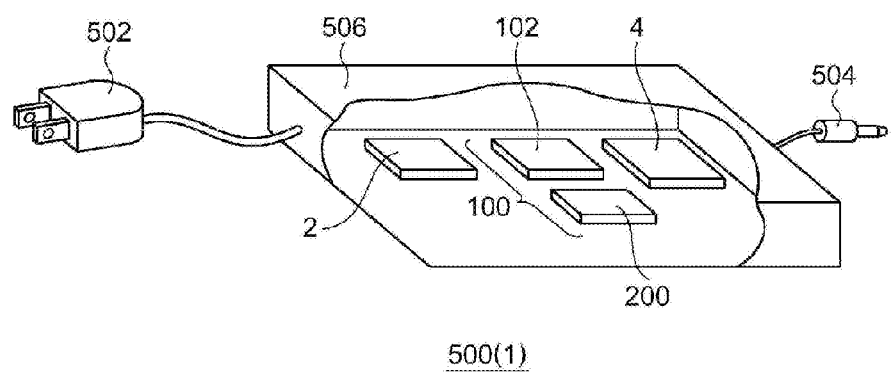
FIG. 12 is a view illustrating a power adapter including a PFC circuit.

Subsequently, application of the PFC circuit 100 will be described. FIG. 12 is a view illustrating a power adapter 500 including the PFC circuit 100. The AC adapter 500 receives an AC voltage $V_{AC}$ in an AC plug 502 from a commercial power supply, converts the AC voltage $V_{AC}$ into a DC voltage $V_{DC}$, and outputs the DC voltage $V_{DC}$ from a DC plug 504. The DC plug 504 is connected to an electronic apparatus to which power is to be fed. For example, the DC plug 504 may be compatible with a USB (Universal Serial Bus) terminal. A rectification circuit 2, the PFC circuit 100 and a DC/DC converter 4 are mounted within a housing 506 of the AC adapter 500. Each of the rectification circuit 2, the main circuit 102 and the DC/DC converter 4 is a group of different circuit components, but each of them is here shown as a single component for simplification. The DC/DC converter 4 converts the output voltage $V_{OUT}$ of the PFC circuit 100 to a predetermined voltage level. For example, the DC/DC converter 4 is an insulation type converter using a transformer.

Figure 13:
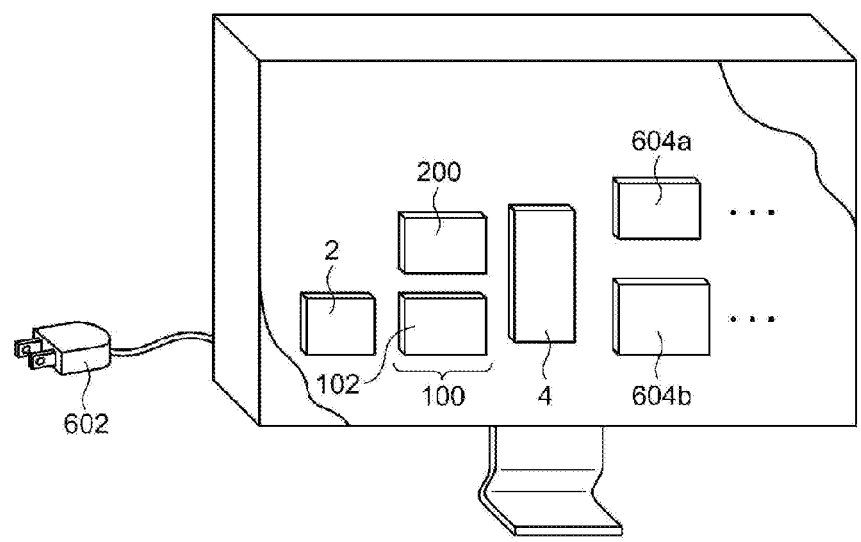
FIG. 13 is a view illustrating an electronic apparatus including a PFC circuit.

FIG. 13 is a view illustrating an electronic apparatus 600 including the PFC circuit 100. Here, a television receiver will be described as one example of the electronic apparatus 600. An AC voltage $V_{AC}$ is supplied from a commercial power supply to an AC plug 602. A rectification circuit 2, a PFC circuit 100 and a DC/DC converter 4 are the same as those in FIG. 12. The output voltage $V_{DC}$ of the DC/DC converter 4 is supplied to a plurality of loads 604a, 604b . . . (only two are here shown for the sake of clarity). The loads 604 include a power supply circuit, a microcomputer (CPU), a memory, a display panel, a gate driver, a source driver, various ICs such as a timing controller and the like, a backlight, and the like.

The present disclosure has been described above by way of embodiments. The disclosed embodiments are illustrated only. It should be understood by those skilled in the art that various modifications to combinations of elements or processes may be made and such modifications fall within the scope of the present disclosure. Such modifications will be described below.

(First Modification)

While the configuration of M(=2) channels has been described in the above embodiment, the present disclosure may be applied to a configuration of three or more channels. For an arbitrary number M of channels, the control circuit 200 may operate as follows.

(First Mode)

The pulse modulator 204 sequentially transitions the pulse modulated signals Sp1 to SpM of the M channels to an on-level with a phase difference of 360°/M.

(Second Mode)

In the pulse modulator 204, a plurality of consecutive switching periods are set as a period group $T_G$, and, in each switching period included in the period group $T_G$, a pulse modulated signal of one channel transitions to an on-level and then an off-level, and pulse modulated signals of the remaining (M−1) channels are kept at an off-level. In addition, during one period group $T_G$, each pulse modulated signal transitions to the off-level at least once after transitioning to the on-level.

Figure 14A:
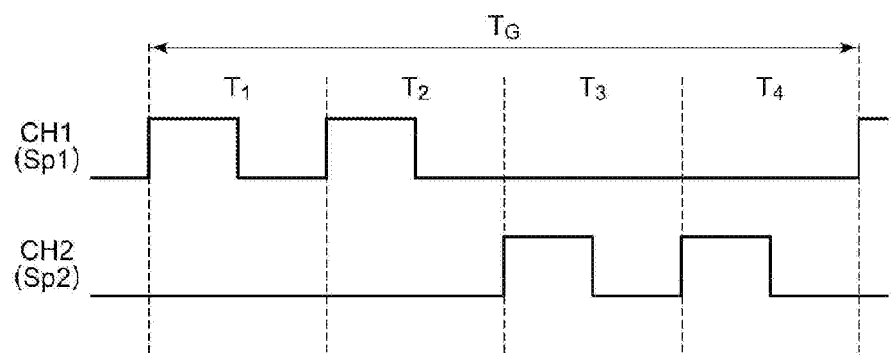
FIGS. 14A and 14B are waveform diagrams showing another control example of the second mode.
Figure 14B:
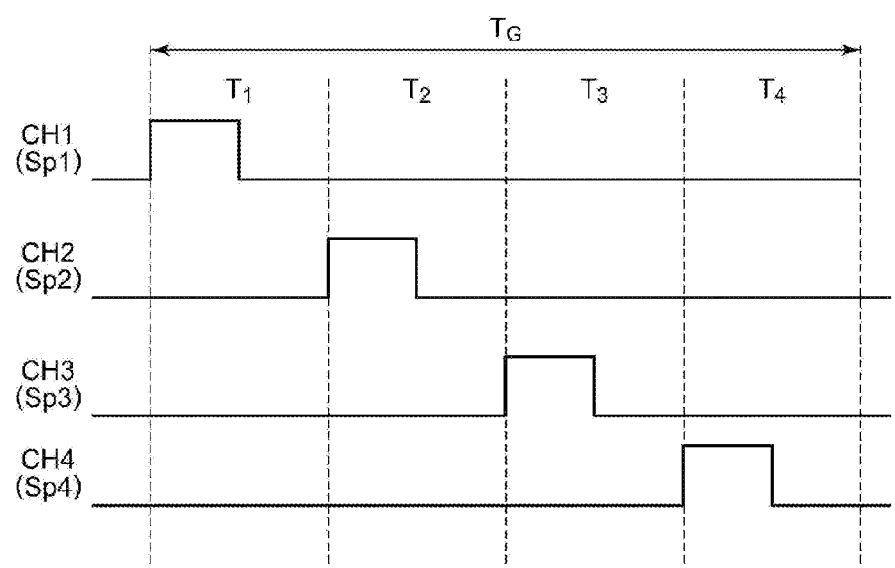

FIGS. 14A and 14B are waveform diagrams showing another control example of the second mode.

Another example of M=2 is shown in FIG. 14A. In this modification, the second mode operates with four switching periods $T_1$ to $T_4$ as one period group $T_G$. Then, in the first and second switching periods $T_1$ and $T_2$, the first channel CH1 is turned on and off. In the third and fourth switching periods $T_3$ and $T_4$, the second channel CH2 is turned on and off.

Another modification of M=4 is shown in FIG. 14B. In this modification, the second mode operates with four switching periods $T_1$ to $T_4$ as one period group $T_G$. Then, in the first to fourth switching periods $T_1$ to $T_4$, the first to fourth channels CH1 to CH4 are switched in turn.

There may be various other modifications of the control sequence in the second mode.

According to the present disclosure in some embodiments, it is possible to prevent an operation frequency from increasing in a light load state.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a power factor correction circuit constituted by two channels, each of which includes a switching transistor, an inductor and a rectification element, comprising:
   an error amplifier configured to amplify an error of a feedback signal according to an output voltage of the power factor correction circuit and a target value of the feedback signal and generate an error signal;
   a pulse modulator configured to generate a first pulse modulated signal and a second pulse modulated signal in a current critical mode in response to the error signal;
   a first driver configured to drive the switching transistor of a first channel based on the first pulse modulated signal;

a second driver configured to drive the switching transistor of a second channel based on the second pulse modulated signal; and
a mode controller configured to monitor a total current of the first channel and the second channel and generate a mode control signal based on the total current,
wherein the pulse modulator switches between a first mode in which a phase difference between the first pulse modulated signal and the second pulse modulated signal is 180° and a second mode in which the first channel and the second channel are exclusively and alternately used every switching period, in response to the mode control signal.

2. The control circuit of claim 1, wherein the power factor correction circuit further includes a sense resistor disposed on a path of an input current of the power factor correction circuit, and
wherein the mode controller configured to generate the mode control signal to switch between the first mode and the second mode based on a result of comparison between a voltage drop of the sense resistor and a threshold voltage.

3. The control circuit of claim 2, wherein the mode controller includes:
a resistor connection terminal to which an external first resistor is connected;
a voltage source configured to supply a reference voltage to the resistor connection terminal via a second resistor; and
a comparator configured to compare a voltage drop of the sense resistor and the threshold voltage generated in the resistor connection terminal.

4. The control circuit of claim 1, wherein the pulse modulator includes:
a first reset signal generator configured to generate a first reset signal defining an on-time of the switching transistor of the first channel based on the error signal;
a second reset signal generator configured to generate a second reset signal defining an on-time of the switching transistor of the second channel based on the error signal;
a first set signal generator configured to generate a first set signal defining an off-time of the switching transistor of the first channel;
a second set signal generator configured to generate a second set signal defining an off-time of the switching transistor of the second channel; and
a logic circuit configured to generate the first pulse modulated signal and the second pulse modulated signal based on the first set signal, the first reset signal, the second set signal and the second reset signal.

5. The control circuit of claim 1, wherein the control circuit is integrated on a single semiconductor substrate.

6. A power factor correction circuit comprising a control circuit of claim 1.

7. An electronic apparatus comprising:
a rectification circuit configured to rectify an AC voltage; and
the power factor correction circuit of claim 6 which is configured to receive an output voltage of the rectification circuit.

8. A power adapter comprising:
a rectification circuit configured to rectify an AC voltage; and
the power factor correction circuit of claim 6 which is configured to receive an output voltage of the rectification circuit.

9. A control circuit of a power factor correction circuit constituted by M (M being an integer of two or more) channels, each of which includes a switching transistor, an inductor and a rectification element, the control circuit comprising:
an error amplifier configured to amplify an error of a feedback signal according to an output voltage of the power factor correction circuit and a target value of the feedback signal and generate an error signal;
a pulse modulator configured to generate pulse modulated signals of the M channels in a current critical mode in response to the error signal;
M drivers which correspond respectively to the M channels and are configured to drive the respective corresponding switching transistors based on the respective corresponding pulse modulated signals; and
a mode controller configured to monitor a total current of the first channel and the second channel and generate a mode control signal based on the total current,
wherein the pulse modulator is further configured to switch between a first mode in which the pulse modulated signals of the M channels sequentially transition to an on-level with a phase difference of 360°/M and a second mode in which a plurality of consecutive switching periods are set as a period group, in response to the mode control signal, and, in each switching period included in the period group, a pulse modulated signal of one channel transitions to an on-level and then an off-level and pulse modulated signals of the remaining (M−1) channels are kept at an off-level, and, during one period group, each pulse modulated signal transitions to the off-level at least once after transitioning to the on-level.

10. The control circuit of claim 9, wherein the power factor correction circuit further includes a sense resistor disposed on a path of an input current of the power factor correction circuit, and
wherein the mode controller configured to generate the mode control signal to switch between the first mode and the second mode based on a result of comparison between a voltage drop of the sense resistor and a threshold voltage.

11. The control circuit of claim 9, wherein M=2, and the period group includes two switching periods.

12. The control circuit of claim 9, wherein the pulse modulator includes:
M reset signal generators, each of which is configured to generate a reset signal defining an on-time of the switching transistor of a corresponding channel based on the error signal;
M set signal generators, each of which is configured to generate a set signal defining an off-time of the switching transistor of a corresponding channel; and
a logic circuit configured to generate the pulse modulated signals of the M channels based on the reset signals of the M channels and the set signals of the M channels.

13. The control circuit of claim 12, wherein the set signal generator of each of the M channels includes:
a zero-cross detection comparator configured to generate a zero-cross detection signal asserted when a current flowing in the inductor of a corresponding channel is zero; and
a delay circuit configured to delay the zero-cross detection signal to generate the set signal.

14. The control circuit of claim 13, wherein the zero-cross detection comparator of each of the M channels is further configured to generate the zero-cross detection signal based on a voltage at a node between the switching transistor and the inductor of the corresponding channel.

15. The control circuit of claim 13, wherein an amount of delay of the delay circuit is set based on an external circuit part.

16. A control method of a power factor correction circuit constituted by two channels, each of which includes a switching transistor, an inductor and a rectification element, the method comprising:
monitoring a total current of the two channels;
generating a mode control signal based on the total current;
amplifying an error of a feedback signal according to an output voltage of the power factor correction circuit and a target value of the feedback signal and generating an error signal;
generating a first pulse modulated signal and a second pulse modulated signal in a current critical mode in response to the error signal;
driving the switching transistor of a first channel based on the first pulse modulated signal; and
driving the switching transistor of a second channel based on the second pulse modulated signal,
wherein the act of generating a first pulse modulated signal and a second pulse modulated signal includes switching between a first mode in which a phase difference between the first pulse modulated signal and the second pulse modulated signal is 180° and a second mode in which the phase difference between the first pulse modulated signal and the second pulse modulated signal is 360° and the first channel and the second channel are exclusively and alternately used, in response to the mode control signal.

17. A control method of a power factor correction circuit constituted by M (M being an integer of two or more) channels, each of which includes a switching transistor, an inductor and a rectification element, the method comprising:
monitoring a total current of the two channels;
generating a mode control signal based on the total current;
amplifying an error of a feedback signal according to an output voltage of the power factor correction circuit and a target value of the feedback signal and generating an error signal;
generating pulse modulated signals of the M channels in a current critical mode in response to the error signal; and
driving the corresponding switching transistors of the M channels based on the corresponding pulse modulated signals, respectively,
wherein the act of generating pulse modulated signals of the M channels includes switching between a first mode in which the pulse modulated signals of the M channels sequentially transition to an on-level with a phase difference of 360°/M and a second mode in which a plurality of consecutive switching periods are set as a period group, in response to the mode control signal, and, in each switching period included in the period group, a pulse modulated signal of one channel transitions to an on-level and then an off-level and pulse modulated signals of the remaining (M−1) channels are kept at an off-level, and, during one period group, each pulse modulated signal transitions to the off-level at least once after transitioning to the on-level.

\* \* \* \* \*